Aug. 17, 1954  R. H. LONG  2,686,434
TRANSMISSION OPERATING MECHANISM
Filed July 19, 1950  3 Sheets-Sheet 1

INVENTOR.
RICHARD H. LONG
BY
H.O. Clayton
ATTORNEY

Aug. 17, 1954      R. H. LONG      2,686,434
TRANSMISSION OPERATING MECHANISM

Filed July 19, 1950      3 Sheets-Sheet 2

INVENTOR.
RICHARD H. LONG
BY
H.O. Clayton
ATTORNEY

Aug. 17, 1954 R. H. LONG 2,686,434
TRANSMISSION OPERATING MECHANISM
Filed July 19, 1950 3 Sheets-Sheet 3
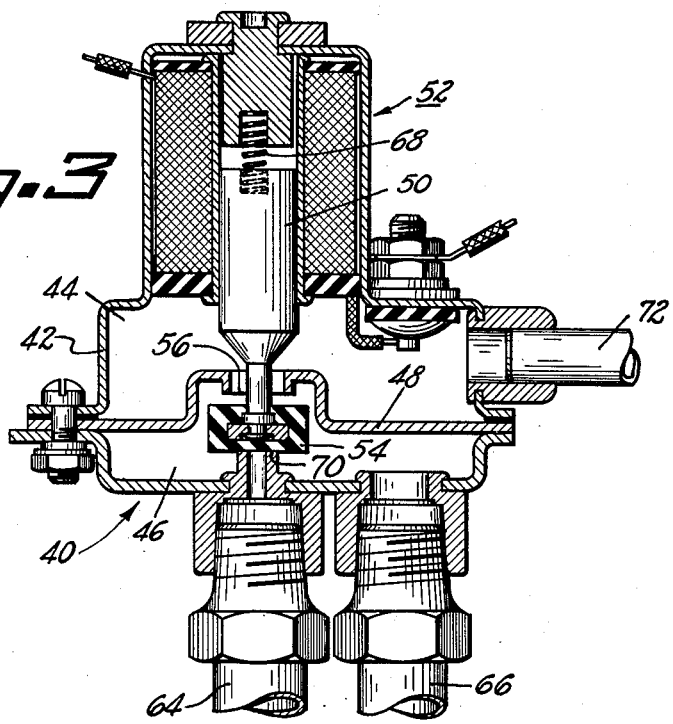
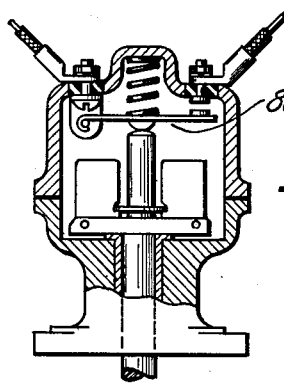
INVENTOR.
RICHARD H. LONG
BY
H. O. Clayton
ATTORNEY Patented Aug. 17, 1954

2,686,434

UNITED STATES PATENT OFFICE 2,686,434

TRANSMISSION OPERATING MECHANISM

Richard H. Long, South Bend, Ind., assignor to Bendix Aviation Corporation, South Bend, Ind., a corporation of Delaware Application July 19, 1950, Serial No. 174,617

6 Claims. (Cl. 74—472)

1

This invention relates to power actuated mechanisms for selectively moving a control element to one or the other of two operative positions, and more particularly to gear shifting mechanisms for operating the speed changing gearing commonly used in coupling the engine or prime mover with the driving wheels or the like of an automotive vehicle or the propeller of a marine craft.

One of the objects of my invention is to provide a power shifting mechanism for a motor vehicle change speed mechanism, said mechanism being electrically selective under the control of engine speed responsive means and engine torque controlling means.

Yet another object of my invention is to provide power means for actuating a two-speed axle transmission mechanism of an automotive vehicle, said power means being automatically operative, to shuttle the transmission mechanism between its two settings, with a normal operation of the accelerator of the vehicle. With the mechanism of my invention, an upshift operation of the transmission is automatically effected when the accelerator is depressed beyond a certain throttle open position and the engine is operating at or above a certain speed; and should the driver desire to effect the low gear setting of the transmission, say to facilitate the passing of a car on the road, he need but depress the accelerator to its wide open throttle position, whereby the mechanism of my invention will operate to establish the transmission in said setting; and with the mechanism of my invention a low gear setting may be established by the operation of a push button switch located in the shift lever of the transmission.

Yet another object of my invention is to provide a mechanism for operating a change speed transmission of an automotive vehicle, said mechanism including a double acting spring and pressure differential operated motor controlled by means including the accelerator of the vehicle and an engine speed responsive governor, said control means being such that a manipulation of the accelerator coupled with an operation of the governor effects an operation of the motor to shuttle the transmission between two of its settings.

A further object of the invention is to provide a compact, easily serviced and relatively simple double acting unit adapted for use in mechanism for operating the shiftable elements of the two-speed axle structure of an automotive vehicle.

The above and other objects and features of

2 the invention will appear more fully hereinafter from a consideration of the following description taken in connection with the accompanying drawings, wherein one embodiment of the invention is illustrated by way of example.

Figure 3 is a sectional view disclosing details of the valve mechanism of my invention;

Figure 5 is a view disclosing the details of the governor operated switch of my invention.

The transmission operating power means constituting my invention is preferably employed to operate a two-speed axle transmission mechanism of an automotive vehicle; however, it may be employed to operate any power transmitting mechanism of the power plant of a land or marine vehicle wherein said mechanism is selectively movable to two operative positions.

Figure 1:
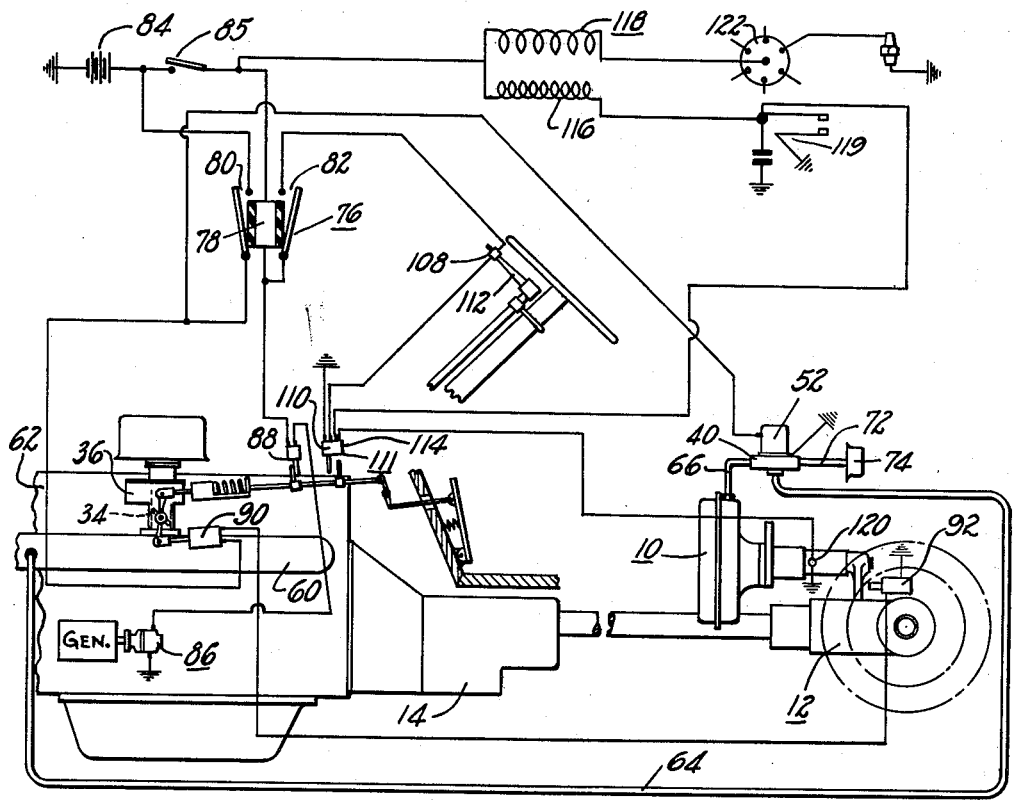
Figure 1 is a diagrammatic view of an automotive vehicle embodying the transmission operating mechanism of my invention.

Referring to Figure 1, a transmission operating power unit 10 is detachably mounted on the carrier of what is known in the automotive art as a two-speed axle, that is, a part of the driving mechanism of the vehicle effecting a gear ratio in addition to the usual driving ratio and different therefrom. This two-speed axle mechanism, actuated by the shifter mechanism of my invention, is indicated by the reference numeral 12, and a change speed transmission mechanism cooperating therewith is indicated by the reference numeral 14. The transmission operating mechanism constituting my invention may be employed to operate a Maybach clutch type of two-speed axle, however, any other well known two-speed axle construction is equally well operated by the mechanism of my invention.

Figure 2:
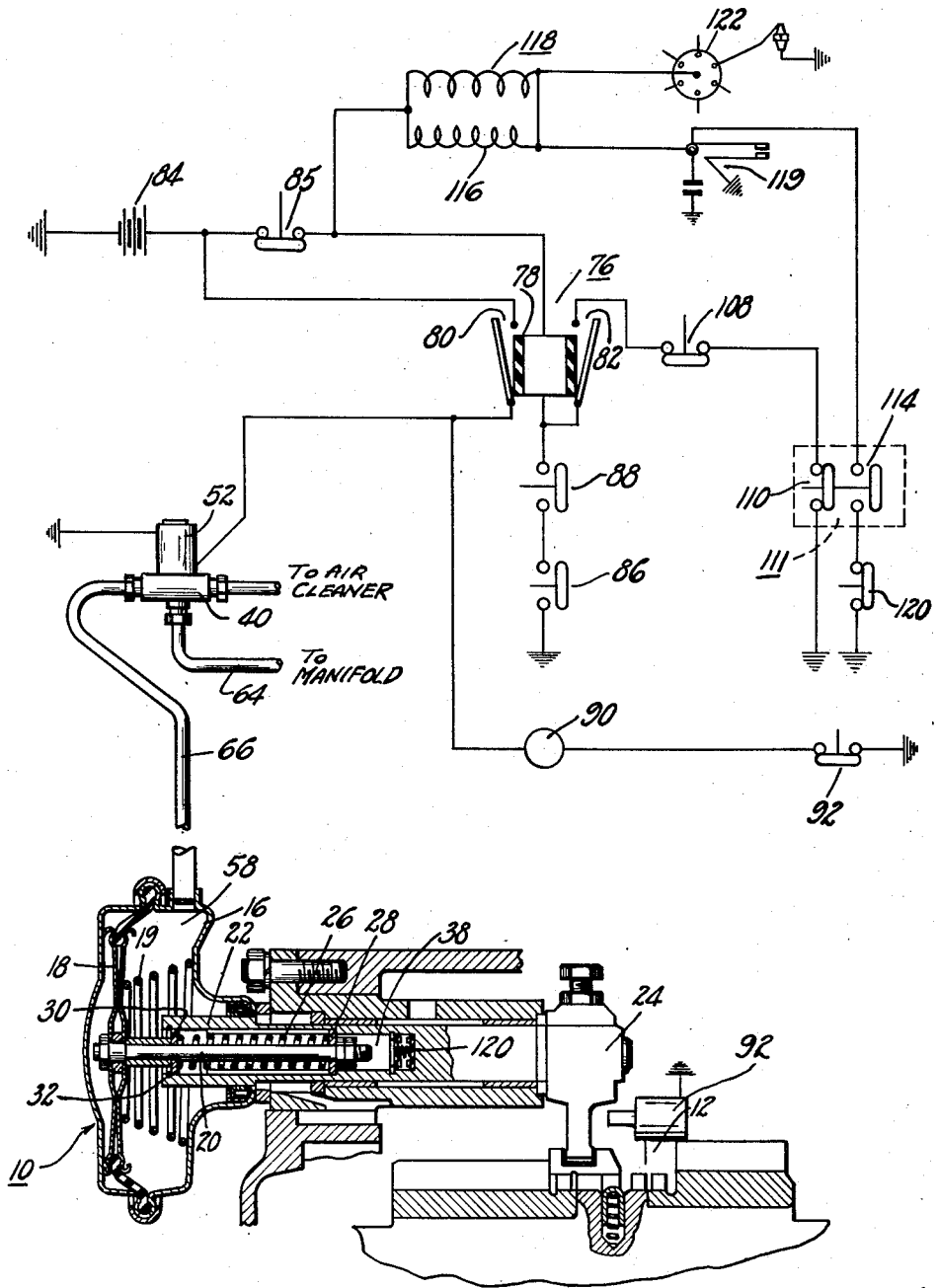
Figure 2 is a view disclosing the electrical hookup of my invention together with details of the transmission operating vacuum motor of the invention.

There is disclosed in Figure 2 a preferred embodiment of the power unit 10 of the transmission operating mechanism of my invention, said unit including a two-part casing 16 housing a power element 18 which is secured to a stem 20. A spring 19 serves to bias the piston 18 to the left as disclosed in Figure 2 the transmission 12 being then established in its low gear setting. This stem is sleeved within a hollow rod 22 which is connected at its outer end to a shifting fork 24 of the two-speed axle mechanism 12. A preloaded spring 26, housed within the rod 22 and sleeved over the stem 20, abuts at one of its ends a stop washer 28 which is in abutment with a shoulder constituting a part of the rod 22; and the other end of the spring 26 abuts a stop washer 30 which is sleeved over the stem 20 and which is in abutment with a stop ring 32 secured to the other end of the hollow rod 22.

When the motor 10 is energized by the spring 19 to move the piston 18 to the left, Figure 2, the stem 20 is moved and with it the washer 28 on the end thereof. In this operation the spring 26 is further compressed by the expansion of the spring 19 to shorten its length; and it is to be noted that the motor 10 may be energized by the spring 19 before the torque load is taken off the transmission mechanism. Then when the torque of the engine is reversed, preferably as a result of a closing of the throttle 34 of the carburetor 36, Figure 1, the rod 22 will move to the left, Figure 2, under the load of the then compressed spring 26 to demesh the transmission; and after the two gears to be meshed are synchronized, the spring 26 continues its expansion to effect a new setting of the transmission.

Describing the high gear operation of the motor 10 when said motor is vacuum energized the piston 18 moves to the right, Figure 2, the end of the stem 20 moving within a recess 38 within the rod 22. In this operation the spring 26 is further compressed inasmuch as the distance between the washers 28 and 30 is shortened the washer 28 remaining stationary. Then as described above, when the engine torque is reversed and the synchronization of the gears has been effected, the spring 26 expands to effect the high gear setting of the transmission.

A solenoid operated three-way valve 40 is provided to control the operation of the motor 10. This valve, no claim to which is made, includes a two-part casing 42, said casing, together with a partition member 48, providing a compartment 44 and a compartment 46. The armature 50 of a grounded solenoid 52 serves to seat and unseat a valve member 54. When the solenoid is energized, to effect a high gear setting of the transmission, the member 54 is seated at 56 thereby connecting a compartment 58 of the motor 10 with the intake manifold 60 of the internal combustion engine 62 of the vehicle. The valve 40 is connected to the manifold by a conduit 64 and to the motor 10 by a conduit 66. When the solenoid 52 is de-energized, to effect a low gear setting of the transmission, a spring 68 operates to seat the valve 54 at 70 thereby venting the motor compartment 58 to the atmosphere via the conduit 66, a conduit 72 and an air cleaner 74.

Figure 4:
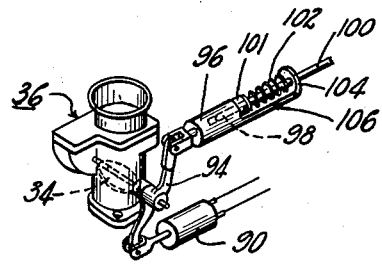
Figure 4 is a view disclosing the throttle closure mechanism of my invention.

The electrical means for controlling the valve operating solenoid 52 constitutes the most important feature of my invention, and includes a hold-down type of relay 76 comprising a coil 78 and normally open breaker switches 80 and 82. The coil is electrically connected in series with a grounded battery 84, the ignition switch 85 of the ignition system of the vehicle, a normally open governor and spring operated breaker switch 86 and a normally closed accelerator operated breaker switch 88 which is opened when the accelerator is depressed to and beyond a certain position, say its one-fourth throttle open position. One or the other of the switches 86 and 88 is grounded However, in Figure 2 of the drawing the switch 86 is so disclosed. The normally open relay switch 80 is electrically connected in series with the battery 84 and the grounded valve operated solenoid 52; and said relay switch is also electrically connected in series with a throttle closing solenoid 90, Figure 4, and a transmission operated breaker switch 92 which is normally biased to its open position when the transmission 12 is established in or is about to be established in its high gear position but which may be closed by the transmission when the latter is established in its low gear position. One or the other of the elements 92 and 90 is grounded, and in the embodiment of my invention disclosed in Figure 2 of the drawings, the former is selected.

Describing the details of the throttle closing mechanism of my invention, the solenoid 90 is connected to a two-armed crank 94 which actuates the throttle valve 34; and the upper arm of said crank is connected to a member 96 which is recessed at 98 to slidingly receive the outer end of an accelerator operated rod 100. A spring 102, sleeved over the rod 100, is positioned between a thrust member 101 secured to the rod 100 and a flange 104 extending from the end of an extension 106 of the member 96. With this mechanism an energization of the solenoid 90 serves to close the throttle valve 34 despite the fact that the accelerator is at the time depressed; for the latter operation merely serves to compress the spring 102.

It is to be noted that the electrical circuit including the throttle closing solenoid 90 is in parallel with the electrical current including the valve operating solenoid 52.

Continuing the description of the electrical control means of my invention, the coil 78 of the relay 76 is also electrically connected in series with the battery 84, the ignition switch 85, a normally closed pushbutton type of breaker switch 108, and a grounded kickdown switch 110 constituting part of an accelerator operated switch mechanism indicated by the reference numeral 111. The switch 108 is preferably mounted on the end of the gear shift lever 112 of the car and is opened, to effect a low gear operation of the mechanism of my invention, when the driver depresses said switch. The normally closed kickdown switch 110 is opened when the accelerator is depressed past its wide open throttle position and concurrent with the latter operation there is effected a closing of a breaker switch 114 which also constitutes a part of the accelerator operated switch mechanism 111. The switch 114 is electrically connected in series with the primary winding 116 of the induction coil 118 of the vehicle and with a grouded breaker switch 120, Figure 2, which is normally open, but which is closed, preferably by the stem 20 of the motor 10, when the transmission is established in or is about to be established in its high gear setting. The induction coil 118, a grounded breaker switch 119 and a distributor 122 of a conventional ignition system of an automobile are diagrammatically disclosed in Figure 2 and with the mechanism of my invention the winding 116 is momentarily grounded by the closing of the accelerator operated kickdown switch 114 and the subsequent opening of the switch 120; and this operation serves to momentarily disable the engine of the vehicle, thereby facilitating the operation of the motor 10 in effecting the downshift, that is low gear operation of the transmission 12.

Describing now the complete operation of the mechanism of my invention, it will be assumed that the engine 62 of the vehicle is disconnected from the transmission 14 by the disengagement of the clutch, not shown, that said transmission is established in one of its settings, say its high gear setting, and that the two-speed axle 12 is established in its low gear setting. The driver of the vehicle will then re-engage the clutch and depress the accelerator to get the car under way.

Now when the speed of the engine reaches a certain factor, say 2,500 R. P. M., the switch 86 will be closed, thereby initiating an operation of the mechanism of my invention to establish a high gear setting of the transmission 12 assuming, of course, that the accelerator is released sufficiently to close the switch 88. This operation effects completion of the electrical circuit, including the relay coil 78, resulting in an energization of said coil. The latter operation will effect a closure of the switches 80 and 82, thereby effecting an energization of the throttle closing solenoid 90 and the valve operating solenoid 52. The throttle valve 34 is thus closed to reverse the engine torque and the motor 10 is vacuum energized to effect the high gear setting of the transmission; and when the latter operation is effected, the switch 92 is broken, thereby effecting a de-energization of the throttle closing solenoid 90 to make possible a reopening of the throttle. It is also to be noted that when the relay coil 78 is energized, the same remains energized until one or the other of switches 108 and 110 is broken.

Continuing the description of the operation of the mechanism of my invention, the transmission 12 will now remain in its high gear setting until the driver wills to establish a low gear setting thereof; and he may effect the latter operation, say to facilitate the passing of a car on the road, by depressing the accelerator past its wide open throttle position. This so-called kickdown operation effects an opening of the switch 110 and a closing of the switch 114, thereby momentarily interrupting the ignition system of the vehicle and de-energizing the solenoid 52 to operate the valve 40, Figure 3, to vent the motor 10 to the atmosphere. The latter operation initiates a spring energization of the motor, thereby effecting a low gear setting of the transmission, said operation being facilitated by the aforementioned momentary interruption of the ignition system of the vehicle, that is, a momentary reversal of the engine torque. However, it is to be remembered that the above described kickdown, that is low gear operation of the transmission, may not be effected if the engine speed fails to exceed the aforementioned 2,500 R. P. M.; for a lower speed will keep the switch 86 open, in other words, the transmission 12 must first be established in its high gear setting before the above described low gear setting may be affected; and the high gear setting is effective after and only after the engine speed is increased to 2,500 R. P. M. and the switch 88 is closed by releasing the accelerator.

The transmission 12 now remains in its low gear setting until the engine speed is increased above the aforementioned critical factor, i. e., 2,500 R. P. M., and the accelerator is released sufficiently to close the switch 88; and as described above, when the switches 88 and 86 are closed, the mechanism becomes operative to again establish the transmission 12 in its high gear setting.

There is thus provided a simple and efficient transmission operating mechanism for shuttling a transmission, i. e., a two-speed axle of an automotive vehicle, between two settings. With the mechanism of my invention, the driver operates but one control, that is the accelerator. The upshift operation of the mechanism is automatically effected provided the accelerator is released to or beyond a certain position and the engine of the vehicle is operating at or above a certain speed; and the downshift operation of the mechanism of my invention is effected, at the will of the driver, by either opening a switch on the shift lever of the car or by depressing the accelerator to its wide open throttle position.

I claim:

1. In an automotive vehicle provided with a change speed transmission mechanism, an ignition system, an internal combustion engine, and an accelerator; power means for operating the transmission including a spring and pressure differential operated motor operably connected to the transmission, a three-way valve for controlling the operation of the motor and means for controlling the operation of the valve and ignition system to automatically effect a vacuum operation of the motor when the accelerator is released to or beyond a certain position and the engine is operating at or above a certain speed, said control means being further operative to effect a spring operation of the motor, facilitated by a certain operation of the ignition system, when the accelerator is depressed to its wide open throttle position; said control means including a grounded solenoid for operating the valve and electrical means for controlling the solenoid including a hold-down relay mechanism comprising a coil and two normally open switches one of said switches being electrically connected to the grounded valve operating solenoid, and further including an accelerator operated switch and an engine governor operated switch electrically connected in series with the coil of the relay.

2. In an automotive vehicle provided with a change speed transmission, an ignition system, an internal combustion engine, and an accelerator; power means for operating the transmission including a motor, valve means for controlling the operation of the motor, and means for controlling the operation of the valve means and ignition system including an engine speed responsive governor, a grounded valve operating solenoid, a hold-down relay mechanism comprising a coil, and two normally open switches operated by said coil one of said switches being electrically connected in series with the valve operating solenoid, electrical means, including a switch operated by the aforementioned governor, for controlling the operation of the coil thereby controlling the operation of the switches, and another electrical means for controlling the operation of the coil in its operation of controlling the operation of the switches.

3. In an automotive vehicle provided with a change speed transmission, an ignition system, an internal combustion engine, and an accelerator; power means for operating the transmission including a motor, valve means for controlling the operation of the motor, and means for controlling the operation of the valve means and ignition system including an engine speed responsive governor, a valve operating solenoid, a hold-down relay mechanism comprising a coil and two normally open switches operated by said coil, one of said switches being electrically connected to the valve operating solenoid, electrical means, including an accelerator operated switch and a switch operated by the governor, for controlling the operation of the coil to thereby control the operation of the relay switches, and other electrical means, including an accelerator operated kick-down switch, for controlling the operation of the coil in its operation of controlling the operation of the relay switches.

4. In an automotive vehicle provided with a change speed transmission, an ignition system, an internal combustion engine, and an accelerator; power means for operating the transmission including a motor, valve means for controlling the operation of the motor and means for controlling the operation of the valve means and ignition system including an engine speed responsive governor, a valve operating solenoid, a hold-down relay mechanism comprising a coil and two normally open switches operated by said coil, one of said switches being electrically connected to the valve operating solenoid; electrical means, including an accelerator operated switch and a switch operated by the governor, for controlling the operation of the coil to thereby control the operation of the relay switches, and other electrical means, including an accelerator operated kick-down switch, for controlling the operation of the relay switches, together with means, including a switch actuated by the accelerator, for momentarily disabling the ignition system to thereby facilitate one of the transmission operating operations of the motor.

5. In an automotive vehicle provided with an ignition system, an accelerator, an internal combustion engine and a change speed transmission capable of being established in one or the other of two settings; power means for operating the transmission including a spring and pressure differential operated motor, valve means for controlling the operation of the motor, and means for controlling the operation of the valve means and ignition system the control of said ignition system thereby facilitating one of the operations of the motor, said control means including a valve operating solenoid, a source of electricity, an engine speed responsive governor, a hold-down relay mechanism comprising a coil and two normally open breaker switches, electrical means, including an accelerator operated switch and switch means operated by the governor, for controlling the operation of the coil of the relay, electrical means interconnecting the source of electricity, one of the breaker switches of the relay and the valve operating solenoid, and other electrical means, including an accelerator operated kick-down switch, connected to the other relay breaker switch.

6. In an automotive vehicle provided with a gear shift lever, an ignition system, a throttle, an accelerator, an internal combustion engine and a change speed transmission capable of being established in one or the other of two settings; power means for operating the transmission including a spring and pressure differential operated motor, valve means for controlling the operation of the motor, and means for controlling the operation of the valve means and ignition system the control of said ignition system facilitating one of the operations of the motor, said control means including a valve operating solenoid, a source of electricity, an engine speed responsive governor, a hold-down relay mechanism comprising a coil and two normally open breaker switches, electrical means including an accelerator operated switch and switch means operated by the governor, for controlling the operation of the coil of the relay, electrical means interconnecting the source of electricity with one of the breaker switches of the relay and the valve operating solenoid, and electrical means, including an accelerator operated kick-down switch and a switch actuated by the gear shift lever, connected to the other relay breaker switch; together with electrical means, including a throttle operating solenoid electrically connected to the latter relay switch, for controlling the operation of the throttle to momentarily close the same when the motor is operating to effect one of the settings of the transmission.

References Cited in the file of this patent

UNITED STATES PATENTS

| Number | Name | Date |
| --- | --- | --- |
| 2,322,479 | Schjolin | June 22, 1943 |
| 2,349,297 | Neracher et al. | May 23, 1944 |
| 2,440,558 | Price | Apr. 27, 1948 |
| 2,454,614 | Peterson et al. | Nov. 23, 1948 |
| 2,490,604 | Syrovy et al. | Dec. 6, 1949 |
| 2,492,923 | Moore et al. | Dec. 27, 1949 |
| 2,499,128 | Brunken | Feb. 28, 1950 |